United States Patent [19]
Baret et al.

[11] Patent Number: 5,181,414
[45] Date of Patent: Jan. 26, 1993

[54] PUMPING APPARATUS FOR PUMPING A GAS BY MEANS OF AN OIL-SEALED VANE PUMP AND APPLICATION TO HELIUM LEAK DETECTORS

[75] Inventors: Gilles Baret, Annecy; Jean-Pierre Chicherie; Jean-Marc Paquet, both of Annecy le Vieux, all of France

[73] Assignee: Alcatel Cit, Paris, France

[21] Appl. No.: 750,999

[22] Filed: Aug. 28, 1991

[30] Foreign Application Priority Data

Aug. 28, 1990 [FR] France .................. 90 10709

[51] Int. Cl.⁵ .............. G01M 3/04; F04B 23/12; F04C 27/02; F04C 29/10
[52] U.S. Cl. .................. 73/40.7; 417/87; 417/205; 418/87; 418/88; 418/96; 418/97; 418/100
[58] Field of Search ............ 417/87, 205; 418/88, 418/96, 97, 100, 87, 98, 99; 73/40.7

[56] References Cited

U.S. PATENT DOCUMENTS

| | | | |
|---|---|---|---|
| 3,707,339 | 12/1972 | Budgen | 418/97 |
| 4,283,167 | 8/1981 | Bassan et al. | 418/96 |

FOREIGN PATENT DOCUMENTS

| | | | |
|---|---|---|---|
| 0158168 | 10/1985 | European Pat. Off. | |
| 0356877 | 3/1990 | European Pat. Off. | |
| 1254176 | 1/1961 | France | |
| 1364063 | 5/1964 | France | |
| 1474137 | 2/1967 | France | |
| 540389 | 3/1956 | Italy | 417/87 |
| 1170190 | 7/1985 | U.S.S.R. | 418/96 |
| 1225919 | 4/1986 | U.S.S.R. | 418/96 |

*Primary Examiner*—John J. Vrablik
*Attorney, Agent, or Firm*—Sughrue, Mion, Zinn, Macpeak & Seas

[57] ABSTRACT

A pumping apparatus for pumping a gas having application to helium leak detectors has a vane and oil-seal type vacuum pump immersed in a closed tank (9) partially filled with oil (10). The apparatus also includes an oil pump (20) for renewing the oil seal located inside the tank. The oil pump is equipped with a noise-reducing mixing device enabling the oil for constituting the oil seal to be mixed with a noise-reducing gas. The noise-reducing gas is fed from the outside of the tank to the mixing device by means of a pipe (24) passing through the wall of the tank and opening via a Venturi tube to the suction duct of the immersed oil pump.

5 Claims, 2 Drawing Sheets

PUMPING APPARATUS FOR PUMPING A GAS BY MEANS OF AN OIL-SEALED VANE PUMP AND APPLICATION TO HELIUM LEAK DETECTORS

The present invention relates to pumping apparatus for pumping a gas by means of an oil-sealed vane pump and to an application of said pumping apparatus to helium leak detectors.

The invention enables pollution from the pumped gas in a pumping unit to be reduced. This is particularly useful for helium leak detectors. Such a leak detector essentially comprises two portions as shown in FIG. 1:

a pumping unit comprising a rotary vane vacuum pump 1, an isolating valve 2 for isolating the vane pump, an air inlet valve 3, and an inlet 4 designed to be connected to an enclosure to be tested, which inlet 4 may also be closed off; and a gas analyzer 5 which includes an inlet valve 6 and which is connected to the pumping unit.

The analyzer 5 detects and measures the quantity of helium that enters the apparatus via the inlet 4. Such a detector is described in French Patent No. 1 474 137, for example.

Testing is performed in the following manner.

Valves 3 and 6 are closed, valve 2 is open and the inlet 4 is connected to the enclosure to be tested. The pump 1 is started so as to evacuate the enclosure. Valve 2 is then closed. The inlet valve 6 is then opened and the measurement is taken by running a jet of helium over the walls of the enclosure to be tested. If the enclosure has a leak, helium enters the enclosure and, from there, it passes via the inlet 4 to reach the analyzer 5 which detects and measures the presence of helium and therefore the leak in the enclosure under test.

However, the analyzer 5 may sometimes detect a leak signal even though the test enclosure has not yet been "sprayed" with helium. This results from the installation being polluted e.g. by a previous test when helium entered the circuit. During the new test, degassing takes place from the walls and from the components of the apparatus causing "background noise" which may be interpreted as a leak.

One way of mitigating this pollution is to run the vane pump 1 for a certain length of time with the valve 3 closed and the valve 2 open, which length of time may, in some cases, be very considerable because the background noise level is sometimes very high. Therefore, it may necessary to pump in this way for as long as two hours. It used to be thought that pollution was mainly due to degassing from the walls and from the oil contained in the vane pump tank, and that, consequently, degassing was very slow.

However, it would seem that the main cause is a concentration of helium in the empty space 19 situated above the surface of the oil in the vane pump tank.

This empty space must therefore be regularly cleared of pollution. To this end, various solutions have been proposed to admit air or an inert gas into the vacuum pump. Document EP 0 158 168 is an example of this. However, all these solutions either entail changes which interfere with the operation of the vacuum pump (special non-return systems, pressure in the stages of the pump, etc.) or are cumbersome to use (adding various valves that need to be controlled during pumping).

The oil seal is intended to reduce leaks in the vacuum pump, thereby improving its performance at limit pressure, and the oil seal constantly renewed. Various possible systems for renewing the oil seal are known. One known forced-feed lubrication device comprises an oil pump equipped with a system for mixing the gas in its tank with the injected oil which comes from the oil therein, so as to constitute a noise-reducing system. An object of that system is to create a lubricating fluid which is both compressible and shock-absorbing so as to make the vacuum pump quieter when it pumps very low quantities of gas, or even when it pumps empty.

In order to solve this pollution problem both simply and cheaply, the present invention makes use of a forced-feed lubrication device equipped with a noise-reducing system so as to reduce pollution in the tank containing the vacuum pump. To this end, instead of the gas mixed with the injected oil being the gas from the tank, as was the case in prior art, it is a gas (e.g. air) sucked in from outside the tank.

The invention therefore provides pumping apparatus for pumping a gas by means of a vacuum pump of the vane-and-oil-seal type, the vacuum pump being immersed in a tank which is closed and which is partially filled with oil, the apparatus also including an oil pump for renewing the oil seal and located in the tank, the oil pump being equipped with a noise-reducing mixing device enabling the oil for constituting the oil seal to be mixed with a noise-reducing gas, the gas being pumped by the vacuum pump via a suction duct passing through the wall of the tank, the pumped gas being delivered by the vacuum pump via a non-return valve into the space in the tank that is situated above the level of the filling oil, an opening being provided through the wall of the tank so that said space communicates with the outside so that the pumped gas may be removed, said pumping apparatus being characterized in that the noise-reducing gas is fed from the outside of the tank to the mixing device by means of a pipe passing through the wall of the tank.

The invention will be better understood and other advantages will appear on reading the following description given by way of non-limiting example with reference to the accompanying drawings, in which.

Figure 1:
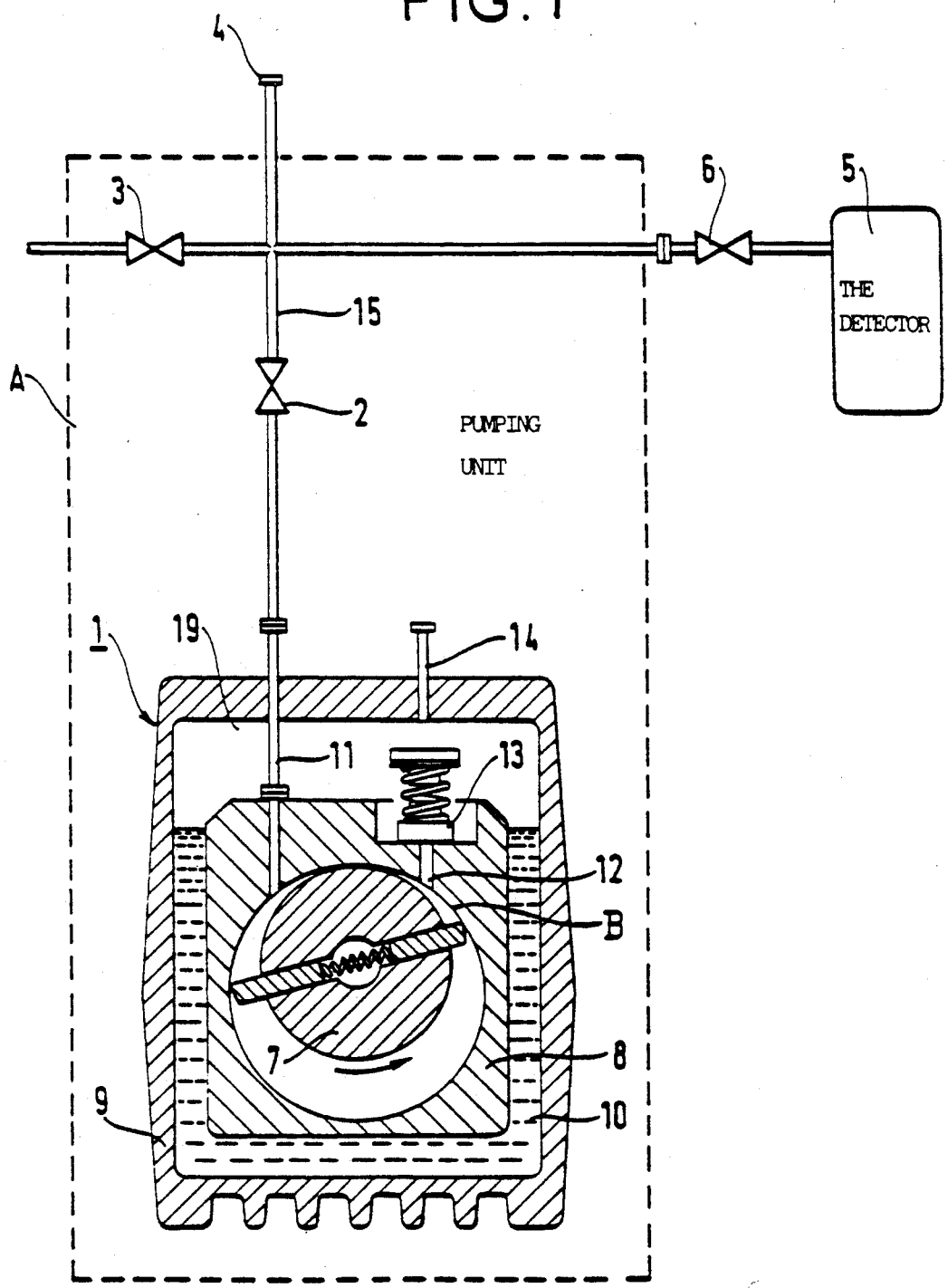
FIG. 1 is a diagram showing a prior leak-detection set-up.

FIG. 1 shows a leak-detection set-up including a pumping unit outlined by a dashed-line rectangle A and comprising a vane pump 1, an isolating valve 2 for isolating the pump, an air inlet valve 3, and an inlet coupling 4 designed to be connected to an enclosure to be tested. A gas analyzer 5 is connected to the pumping unit by an inlet duct equipped with an admission valve 6.

The vane pump 1 comprises a rotor 7 and a stator 8. The stator 8 is placed in a tank 9 which is partially filled with oil 10.

A suction duct 11 connects the inside of the stator to the outside of the tank, and an exhaust channel 12 connects the inside of the stator to the inside of the tank via a non-return valve 13. The tank 9 communicates with the outside via an opening 14. A link duct 15 connects the inlet coupling 4 to the suction duct 11 which is equipped with the isolating valve 2. The air inlet valve 3 is situated between the inlet coupling 4 and the isolating valve 2, and it makes communication possible between the outside and the link duct 15.

In the invention, the oil seal of the vacuum pump is renewed by a forced-feed lubrication device comprising an oil pump and equipped with a noise-reducing system. A noise-reducing system is constituted by mixing gas with the lubricating oil. Advantageously, the noise-reducing gas is air.

Advantageously, the oil pump is disposed in the oil tank. Any type of oil pump may be used for pumping apparatus of the invention. For example, another vane pump may be used, with the rotors both of the vacuum pump and of the oil pump being mounted on a common shaft, so that they are started together and stopped together.

Figure 2:
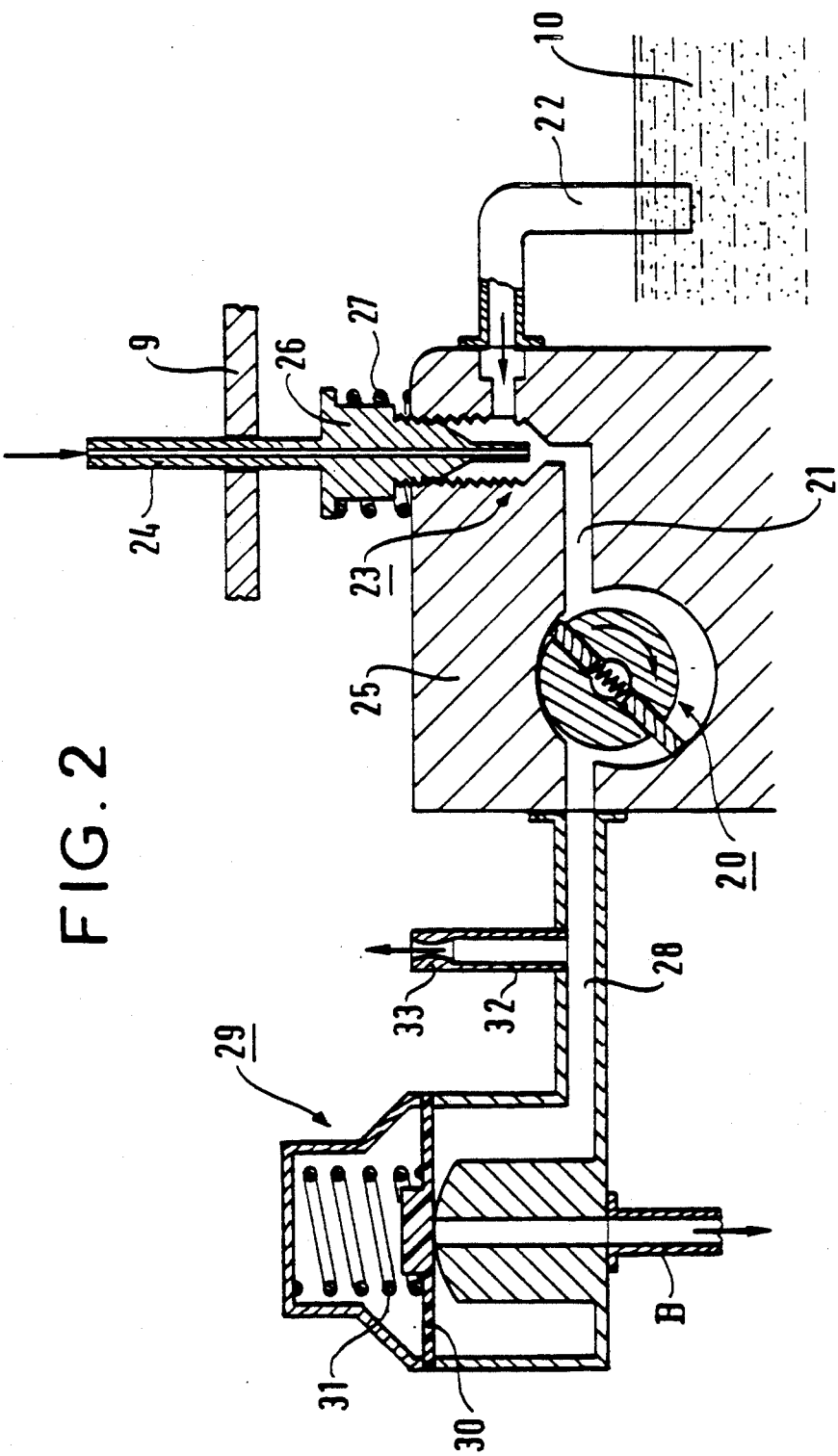
FIG. 2 is a diagram showing an oil pump for renewing the oil seal, which oil pump is equipped with a noise-reducing system.

FIG. 2 is a diagram showing the oil pump equipped with the noise-reducing system and associated with the vacuum pump, the entire assembly being placed inside the tank 9, and only a portion of the wall thereof being shown. The oil pump 20 sucks in a mixture of tank oil 10 and a gas, e.g. air, via its suction duct 21.

In operation, the oil sucked in by the pump 20 and injected via the oil intake tube is accelerated by means of a Venturi tube 23. A pipe 24 passes through the wall of the tank 9 and enables non-polluted air to be fed in. At its end that is inside the tank, the pipe 24 is screwed into the body 25 of the oil pump. The Venturi tube 23, also implemented in the body of the pump, communicates at one end with the pipe 24 and with the oil intake tube 22, and at its other end with the suction duct 21.

A pressure drop is created at the end of the air intake pipe 24 which is inside the Venturi tube. This pressure drop is due to the air being pumped by the moving oil streams. The lubricating oil is thus gassed, thereby providing noise-reduction for the pump.

Admitting noise-reducing gas into the oil pump affects the limit pressure thereof. A compromise is made between sound level and limit pressure in the following manner. By screwing in the head 26 of the air intake pipe 24, the speed of the oil in the Venturi tube is increased, thereby increasing the quantity of injected air. The sound level decreases but the limit pressure increases. By unscrewing the head 26, the speed in the Venturi tube is reduced, thereby reducing the quantity of injected air. The sound level increases but the limit pressure decreases. This adjustment may be made via the orifice used for filling the tank with oil, while the pumping apparatus is in operation. A spring 27, disposed between the head 26 and the body of the pump 25, contributes to proper adjustment of the noise-reducing system.

It should be appreciated that if one mixes less air into the injected oil, the sound level of the oil pump is higher, however, on the other hand, the ultimate vacuum of the vacuum pump of the apparatus or system as illustrated in FIG. 1 immersed in the oil and defined by stator 8 and rotor 7 bearing the two oppositely directed spring biased vanes in contact with the internal wall of the stator will be improved. In other words, the maximum permissible pressure will be lower. The gas and oil mixture reduces noise for the following reasons. The sound level of a rotary vane pump is mainly due to the noise produced by the vane tips rubbing against the stator wall during the sliding movement as the quarter moon configuration pumping chamber sees more or less of the tips of the vanes protruding the rotor 7 during rotation of the rotor. During the compression phase, the vane pushes the gas by compressing it towards the discharge opening i.e. exhaust channel 12, FIG. 1. After the outflow or discharge phase, the oil remaining inside the stator without having been fully driven by the gases because of its wetting capacity results in the residual oil necessarily crossing the tangent generator between the stator and rotor (ranging between 10 and 100 microns depending upon the pump). All of the oil cannot pass through so the vane withdraws inside the rotor to leave room for the oil volume. However, afterwards in the suction phase, as occurs when the vane to the left of the axis of the rotor 7, FIG. 1, rotates counter-clockwise in the direction of the arrow, causes the oil to escape when the vane passes in front of the suction orifice at the outlet of the suction duct 11 within the vacuum pump body or stator 8, at which time the vane, which is moved radially outwardly in its slot by the effect of centrifugal force and/or the compression coil spring between the two vanes strikes and bounces from the stator internal circuit or wall, thus producing the noise which must be suppressed as a result of conventional pump operation.

By using a mixture of air and oil, it is possible to compress the oil and gas mixture, and thus absorb the spring or centrifugal force return of the vane inside its slot in the direction of the rotor axis, as well as its exit from that slot as the pumping chamber increases in size during counter-clockwise rotation due to the eccentric positioning of the rotor 7 relative to the cylindrical or circular hole within the stator 8 forming the pumping chamber between elements 7, 8.

Thus, the air/oil mixture acts as a shock absorber relative to the sliding vane and reduces the amplitude of its movement as well as its impact on the stator, hence a reduction in noise. A large amount of air significantly reduces the sound level of the oil pump during its operation.

While on the one hand, by increasing the air content of the air/oil mixture the noise, i.e. sound level, of the pump decreases, there is an adverse effect on the vacuum pump 1.

The oil-air mixture is admitted into the vacuum pump to constitute the oil seal, via the duct 28 and the non-return device 29. The mixture enters the compression chamber of the vacuum pump at point B (see FIG. 1).

While a special gas (e.g. helium) is being pumped by means of suction from the vacuum pump, the gas is delivered into the oil tank. The air pumped via the noise-reducing pipe is also delivered into the oil tank, but this air contains none or very little of the special gas. Therefore, pollution may be removed via the opening 14 from the space in the tank situated above the oil level.

This enables the following results to be obtained:

the partial pressure of the pumped gas during vacuum pump suction is very low due to the fact that said pumped gas is not re-cycled; and the pumped gas is diluted and carried out of the oil tank, thereby reducing pollution in the pump.

If the pumping apparatus stops, the non-return device 29, comprising a diaphragm 30 and a spring 31, closes off the oil intake of the vacuum pump and, therefore, the noise-reducing gas intake.

A tube 32 may be connected to the duct 28 so as to connect it to a priming jet 33 for priming the oil pump.

When the pumping apparatus is applied to helium leak detectors, the following operations may be performed by fixing the detector panel to the end of the duct 24 that is outside the tank:

when the detector is started, without making a "vacuum" connection, the area surrounding the outside end may be saturated by a helium jet, thereby quickly polluting the helium pumping circuit so as to test that the helium cell of the apparatus is operating properly; this saves time in starting and monitoring the apparatus, and also saves time between two measurements; and while waiting for the apparatus to recover from helium saturation, a blast of compressed air may be sent via the outside end so that the residual helium is expelled almost instantaneously from the vacuum circuit.

The invention enables a vane pump having an oil seal to be used to pump light gases without any major modifications being made to the pumping apparatus, without any other equipment being added, and without any change in operation for the user.

When used in an application to helium leak detectors, the invention saves time.

We claim:

1. Pumping apparatus for pumping a gas comprising a vacuum pump of the vane-and-oil-seal type (1) immersed in a closed tank (9) partially filled with oil (10), said vacuum pump comprising a vacuum pump suction duct for pumping said gas, said vacuum pump suction duct passing through a wall of the tank, a non-return valve (13) for delivering pumped gas by said vacuum pump into a space (19) in said tank situated above the level of the oil (10), an opening (14) within the wall of the tank to communicate said space (19) with the outside to remove pumped gas, an oil pump (20) located in said tank for renewing the oil seal of the vacuum pump, said oil pump including an oil pump oil intake tube opening at one end to the oil within the tank and at a second end to said oil pump suction duct, and an oil pump outlet duct coupled to said vacuum pump for renewing the oil seal of the vacuum pump, said oil pump further comprising a noise-reducing mixing device, said mixing device including means for mixing a noise-reducing gas with said oil prior to entering said oil pump suction duct, and said oil pump further comprising a pipe (24) passing through the wall of the tank (9) for feeding said noise-reducing gas from the outside of the tank to said mixing device, and said mixing device being interposed between said oil pump oil intake tube and said oil pump suction duct.

2. Pumping apparatus according to claim 1, wherein the oil pump (20) is a vane pump.

3. Pumping apparatus according to claim 1 or 2, wherein said mixing device comprises a Venturi tube (23) within said oil pump for mixing the oil and the noise-reducing gas.

4. Pumping apparatus according to claim 1, further comprising a non-return device (29) disposed in a circuit for renewing the oil seal, between the oil pump (20) and a point of entry (B) into said vacuum pump.

5. A helium leak detector comprising a pumping apparatus (A), said pumping apparatus (A) comprising a vacuum pump of the vane-and-oil seal type (1) immersed in a closed tank (9) partially filled with oil (10), said vacuum pump comprising a vacuum pump suction duct for pumping said gas, said vacuum pump suction duct passing through a wall of said tank, a non-return valve (13) delivering the pumped gas of said vacuum pump into a space (19) in the tank situated above the level of the filling oil (10), an opening (14) provided within the wall of the tank to communicate said space (19) with the outside to remove the pumped gas, an oil pump (20) located in said tank for renewing the oil seal of the vacuum pump, said oil pump including an oil pump suction duct, an oil intake tube opening at one end to the oil within the tank and at a second end to the oil pump suction duct, and an oil pump outlet duct coupled to said vacuum pump for renewing the oil seal of the vacuum pump, a noise-reducing mixing device for said oil pump including means for mixing a noise-reducing gas with said oil, and a pipe (24) for passing through the wall of the tank (9) for feeding the noise-reducing gas from outside the tank (9) to said mixing device, and said mixing device being interposed between said oil intake tube and said oil pump suction duct, and said helium leak detector further comprising a helium analyzer (5) operatively coupled to said vacuum pump suction duct.

* * * * *